United States Patent

Wikström

[11] Patent Number: 5,994,532
[45] Date of Patent: Nov. 30, 1999

[54] FINISHING AGENT

[75] Inventor: Olle Wikström, Kristianstad, Sweden

[73] Assignee: Sveriges Stärkelseproducenter, Förening Upa, Karlshamn, Sweden

[21] Appl. No.: 08/793,348

[22] PCT Filed: Jul. 1, 1996

[86] PCT No.: PCT/SE96/00873

§ 371 Date: Feb. 24, 1997

§ 102(e) Date: Feb. 24, 1997

[87] PCT Pub. No.: WO97/04167

PCT Pub. Date: Feb. 6, 1997

[30] Foreign Application Priority Data

Jul. 17, 1995 [SE] Sweden .................................. 9502631

[51] Int. Cl.$^6$ ....................................................... A23G 3/00
[52] U.S. Cl. ............................. 536/128; 536/45; 536/47; 536/55.3; 162/158; 162/175; 106/210; 435/172.3; 435/320.1

[58] Field of Search ..................................... 162/158, 175; 536/45, 47, 55.3, 128; 435/172.3, 320.1; 106/210

[56] References Cited

U.S. PATENT DOCUMENTS 5,365,016 11/1994 Burrell et al. .

FOREIGN PATENT DOCUMENTS 0353212 1/1990 European Pat. Off. .
1028758 5/1966 United Kingdom .

*Primary Examiner*—James O. Wilson
*Attorney, Agent, or Firm*—Smith, Gambrell & Russell, LLP

[57] ABSTRACT

The use of amylopectin-type starch obtained from potato that has been subjected to a genetical engineering modification to suppress the formation of amylose-type starch, as a finishing agent in papermaking is described.

20 Claims, No Drawings

FINISHING AGENT

The present invention relates to the use of amylopectin-type starch or derivatives thereof as a finishing agent in papermaking.

More specifically, the present invention relates to the use of amylopectin-type starch obtained from potato that has been modified by genetical engineering, to suppress the formation of amylose-type starch.

BACKGROUND OF THE INVENTION

In the manufacture of paper and paperboard intended for some kind of printing the print-receiving surface is treated either by a pure starch solution or by a coating slip. When traditional starch of any known origin (potato, maize, wheat and tapioca) is used, more than one chemical modification step is required in many cases to obtain a product possessing sufficient stability. The various modification steps usually include a stabilising step, for instance an etherification reaction with propene dioxide or an esterification reaction with vinyl acetate or acetic anhydride, and a degradation step, such as oxidation, enzymatic degradation, acid hydrolysis or so-called thermo-chemical conversion. During the above steps substitution of the starch takes place, and the degree of substitution pertaining to the corresponding stabilising step usually amounts to 0.01–0.5 mole/mole glucose, preferably 0.05–0.20 mole/mole.

The necessity to carry out more than one modification step entails costs and has negative effects on the environment, and a reduction of the required number of chemical modification steps thus is desirable.

OBJECTS OF THE INVENTION

The object of the present invention is to reduce the number of chemical modification steps necessary to obtain a stable finishing agent for use on paper. This object is achieved by using amylopectin-type starch of the kind out-lined in the introduction, which starch additionally possesses the characteristics defined in the appended claims.

SUMMARY OF THE INVENTION

In accordance with the present invention amylopectin-type starch or derivatives thereof thus are used as a finishing agent in papermaking.

The expression "amylopectin-type starch" as used throughout in the present application text relates to starch obtained from potato that has been submitted to genetical engineering in order to suppress the formation of amylose-type of starch. The expression "derivatives thereof" relates to chemically, physically and/or enzymatically derivatised amylopectin-type starch. The amylopectin content of amylopectin-type starch is in excess of 95%, preferably in excess of 98%. The remaining ingredient in amylopectin-type starch is amylose.

A detailed description of the above amylopectin-type starch and derivatives thereof and the methods of their production is found in the Swedish Patent Specification 9004096-5 (Amylogene HB).

When practising the invention, amylopectin-type starch is added in amounts of 0.5–8% by weight, preferably 2–6% by weight, during the production process.

By means of the present invention it thus becomes possible to eliminate the above-mentioned stabilising step, since the amylopectin in the starch used in accordance with the invention, having strongly reduced amylose contents on account of its branched structure, possesses excellent stability. Thus, only one chemical reaction is required to produce the finishing agent, and consequently surface-sizing and coating products may be manufactured in a manner that is considerably less harmful to the environment than has hitherto been possible. The reason therefor is not only the elimination of the modification step but also that it has become possible to alter the degradation step. In consequence of this alteration the amount of oxidising agent required to degrade the amylopectin in the starch used in accordance with the invention is approximately 50% lower than the amount required to degrade traditional potato starch. In general, sodium hypochlorite, hydroperoxide or some type of persulphate compound, such as sodium persulphate, is used as the degradation chemical.

It is not previously known to use amylopectin-type starch as a finishing agent for use on paper. Practical tests have shown, however, that the use of amylopectin-type starch gives surprising and unexpected combined effects inasmuch as it permits the finishing agent to be produced by a simplified as well as environmentally less harmful method.

The invention will be explained in greater detail in the following by means of the Examples below.

EXAMPLE 1

Oxidised starch based on potato starch was produced in the following manner. 100 kg potato starch were formed into a slurry in water. The pH-value of the slurry was adjusted to 9.5 by means of sodium hydroxide. 23.4 litres of sodium hypochlorite containing an active substance of 150 g/litre active chlorine were added. The pH-value of the reaction was maintained constant by addition of sodium hydroxide. Once the reaction was complete, i.e. when all chlorine had been used up, the reaction was interrupted by neutralisation, by means of hydrochloric acid, to a pH-value of 5.5, whereupon the product was dewatered and washed before drying. The following values were obtained from an analysis of the product:

| | | |
|---|---|---|
| Dry contents, % | 82.4 | |
| pH of slurry | 8.0 | |
| pH of solution | 6.4 | |
| Conductivity, $\mu$S/cm | 155 | |
| Contents of carboxyl, % | 0.87 | |
| Viscosity at different temperatures | | |
| Viscosity, cP, 25%, 100 rpm | 80° C. | 80 |
| | 70° C. | 95 |
| | 50° C. | 135 |
| | 30° C. | 232 |
| Viscosity at different concentrations | | |
| Viscosity, cP, 50° C., 100 rpm | 10% | 26 |
| | 15% | 47 |
| | 20% | 76 |
| | 25% | 135 |
| | 30% | 343 |
| | 35% | 600 |
| Stability | | |
| Viscosity, cP, 25%, 25° C., 100 rpm | 0 min | 350 |
| | 60 min | 580 |
| | 120 min | 780 |
| | 180 min | 1250 |
| | 1 day | firm gel formed |

At comparatively high concentration levels (25%), the product exhibits very poor stability at low temperatures (25° C.), and already after the lapse of two h the viscosity is more than doubled. This behaviour is typical in traditional oxidised starches, and these products can only be used at low concentration levels and when the temperature is at least 50° C.

EXAMPLE 2

Oxidised amylopectin starch from potato was produced in the following manner. 100 kg amylopectin-type starch was formed into an aqueous slurry. The pH value of the slurry was adjusted to 9.5 by means of sodium hydroxide. 11.0 litres of sodium hypochlorite containing an active substance of 150 g/litre active chlorine was added. The pH value of the reaction was maintained constant by addition of sodium hydroxide. Once the reaction was completed, i.e. when all chlorine had been consumed, the reaction was interrupted by neutralisation, by means of hydrochloric acid, to a pH value of 5.5, whereupon the product was dewatered and washed before drying. The following values were obtained in an analysis of the product:

| Dry contents, % | 83.5 | |
|---|---|---|
| pH of slurry | 8.0 | |
| pH of solution | 6.1 | |
| Conductivity, $\mu$S/cm | 149 | |
| Contents of carboxyl, % | 0.76 | |
| Viscosity at different temperatures | | |
| Viscosity, cP, 25%, 100 rpm | 80° C. | 78 |
| | 70° C. | 92 |
| | 50° C. | 131 |
| | 30° C. | 198 |
| Viscosity at different concentrations | | |
| Viscosity, cP, 50° C., 100 rpm | 10% | 24 |
| | 15% | 44 |
| | 20% | 73 |
| | 25% | 116 |
| | 30% | 203 |
| | 35% | 603 |
| Stability | | |
| Viscosity, cP, 25%, 25° C., 100 rpm | 0 min | 267 |
| | 60 min | 267 |
| | 120 min | 267 |
| | 180 min | 270 |
| | 1 day | 311 |
| | 2 days | 315 |
| | 3 days | 350 |

The stability of the product is highly satisfactory, also at low temperatures (25° C.), and the viscosity had increased only marginally after storage of the product for up to 3 days. The product may be used without difficulty in high concentrations, also if the temperature is allowed to become lower. This is possible in the case of products having potato starch as its base only if the product is stabilised by an esterification or etherification reaction.

I claim:

1. A method of finishing a paper product comprising: applying amylopectin-type starch obtained from a genetically modified potato or derivatized amylopectin-type starch as a finishing agent to a surface of a paper product, said potato having been genetically modified to suppress the formation of amylose-type starch.

2. The method of claim 1 wherein the amylopectin-type starch or derivatized amylopectin-type starch contains more than 95% amylopectin.

3. The method of claim 1 wherein amylopectin-type starch or derivatized amylopectin-type starch contains more than 98% amylopectin.

4. The method of claim 1 wherein the amylopectin-type starch or derivatized amylopectin-type starch is applied to the paper in the amount of from 0.5 to 8% by weight.

5. The method of claim 1 wherein the amylopectin-type starch or derivatized amylopectin-type starch is applied to the paper in the amount of from 2 to 6% by weight.

6. The method of claim 1 wherein derivatized amylopectin-type starch is used which has been chemically, physically or enzymatically derivatized.

7. The method of claim 1 wherein derivatized amylopectin-type starch is used which has been derivatized by a method selected from the group consisting of oxidation, enzymatic treatment, acid hydrolysis and thermo-chemical conversion.

8. The method of claim 1 wherein derivatized amylopectin-type starch is used which has been derivatized by thermo-chemical conversion using a member of the group consisting of persulphate compounds and peroxide compounds.

9. The method of claim 3 wherein the amylopectin-type starch or derivatized amylopectin-type starch is applied to the paper in the amount of from 0.5 to 8% by weight.

10. The method of claim 3 wherein the amylopectin-type starch or derivatized amylopectin-type starch is applied to the paper in the amount of from 2 to 6% by weight.

11. The method of claim 3 wherein the derivatized amylopectin-type starch is used which has been chemically, physically or enzymatically derivatized.

12. The method of claim 3 wherein derivatized amylopectin-type starch is used which has been derivatized by a method selected from the group consisting of oxidation, enzymatic treatment, acid hydrolysis and thermo-chemical conversion.

13. The method of claim 3 wherein derivatized amylopectin-type starch is used and has been derivatized by thermo-chemical conversion using a member of the group consisting of persulphate compounds and peroxide compounds.

14. The method of claim 10 wherein derivatized amylopectin-type starch is used which has been chemically, physically or enzymatically derivatized.

15. The method of claim 10 wherein derivatized amylopectin-type starch is used which has been derivatized by a method selected from the group consisting of oxidation, enzymatic treatment, acid hydrolysis and thermo-chemical conversion.

16. The method of claim 10 wherein derivatized amylopectin-type starch is used which has been derivatized by thermo-chemical conversion using a member of the group consisting of persulphate compounds and peroxide compounds.

17. A paper product finished by the method according to claim 1.

18. A paper product finished by the method according to claim 3.

19. A paper product finished by the method according to claim 10.

20. A paper product finished by the method according to claim 16.

* * * * *